United States Patent [19]

Wilke

[11] 3,844,183
[45] Oct. 29, 1974

[54] DETENT ASSEMBLY FOR A VEHICLE EMERGENCY BRAKE ACTUATING MECHANISM

[75] Inventor: David J. Wilke, York, Pa.
[73] Assignee: Pennsylvania Wire Rope Corporation, Williamsport, Pa.
[22] Filed: June 6, 1973
[21] Appl. No.: 367,543

[52] U.S. Cl............... 74/517, 74/512, 74/520, 192/3 R, 192/4 A
[51] Int. Cl............................................. G05g 1/04
[58] Field of Search............ 74/512, 520, 517, 526, 74/100 R

[56] References Cited
UNITED STATES PATENTS
2,975,654  3/1961  Vigmostad ........................ 74/520
3,741,033  6/1973  Wilke .............................. 74/517 X Primary Examiner—Benjamin W. Wyche
Assistant Examiner—Frank H. McKenzie, Jr.
Attorney, Agent, or Firm—Brady, O'Boyle & Gates

[57] ABSTRACT

In a vehicle emergency brake actuating mechanism wherein an over-center toggle linkage is operatively connected between the foot pedal lever and the brake actuating cable, whereby pressure can be applied to the emergency brake pedal to selectively brake the vehicle in a manner similar to the conventional hydraulic brake system, or to fully actuate the emergency brake by forcing the toggle linkage to the over-center locked position; a detent movable into the path of the toggle linkage to prevent the toggle linkage from moving to the over-center locked position while the vehicle is in an operative disposition; the detent being movable from the path of the toggle linkage to allow the linkage to move to the over-center locked position when the vehicle is in an inoperative disposition.

9 Claims, 7 Drawing Figures

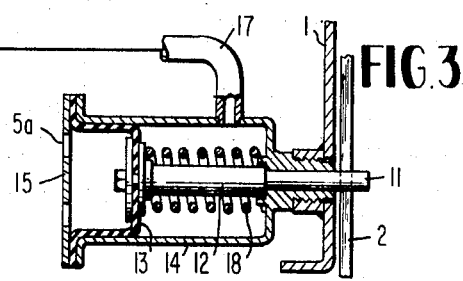
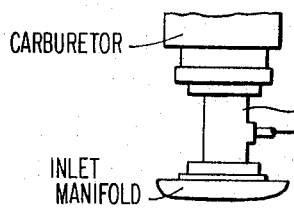
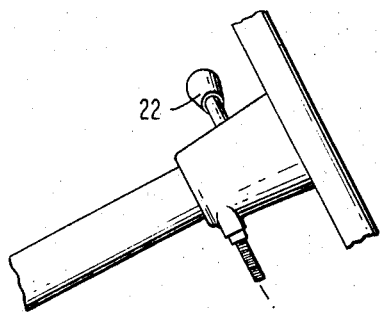
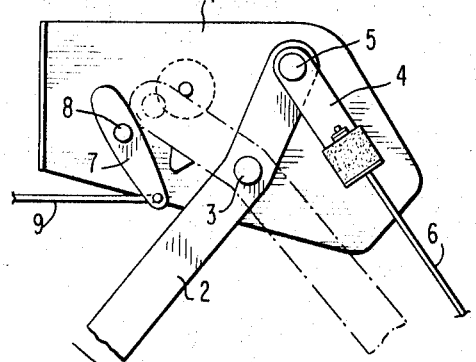
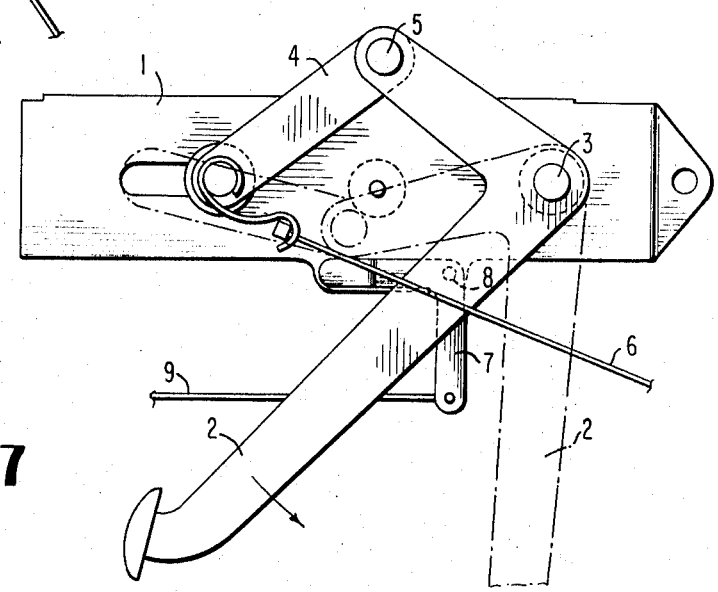

1

DETENT ASSEMBLY FOR A VEHICLE EMERGENCY BRAKE ACTUATING MECHANISM

BACKGROUND OF THE INVENTION

In my copending application Ser. No. 213,494, filed Dec. 29, 1971, now U.S. Pat. No. 3,741,033, there is disclosed an emergency brake actuating mechanism having an over-center toggle linkage operatively connected between the foot pedal lever and the brake actuating cable, whereby when the toggle linkage is on one side of the fixed, center pivot the emergency brake pedal is in the released position allowing the operator to intermittently jogg press the foot pedal to actuate the emergency brake in a manner similar to the conventional hydraulic brake system. When the brake pedal is fully depressed, the toggle linkage is displaced to the opposite side of the fixed center pivot thereby actuating the emergency brake to the locked position.

In the continuing research and development to improve the emergency brake actuating mechanism disclosed in my aforesaid pending application, a detent assembly has been devised which is movable into the path of the toggle linkage when the vehicle is underway to thereby prevent the linkage from being displaced to the opposite side of the fixed center pivot, whereby the emergency brake may be employed in a manner similar to the conventional hydraulic brake system at all times while the vehicle is underway irrespective of the pressure applied to the toggle linkage by the application of the operator's foot to the emergency brake pedal. The detent assembly is movable out of the path of the toggle linkage when the vehicle is not underway whereby the toggle linkage is displaceable to the opposite side of the fixed center pivot to thereby actuate the emergency brake to the locked position.

The detent assembly comprises, a pin mounted for reciprocatory movement adjacent the toggle linkage. In one embodiment, the pin is operatively connected to the vehicle engine manifold; in another embodiment, the pin is operatively connected to the vehicle ignition switch and in a third embodiment the pin is operatively connected to the vehicle gear shift lever. In the respective embodiments, the pin is moved into the path of the toggle linkage when the engine is running, the ignition switch is closed and the shift lever is not in "parking" position.

BRIEF DESCRIPTION OF THE DRAWINGS

FIG. 3 is a fragmentary, diagrammatic, side elevational view, partly in section, showing the detent assembly connected to the manifold of a vehicle engine;

FIG. 4 is a view similar to FIG. 3, showing the detent assembly of the present invention connected to the ignition switch of a vehicle engine;

FIG. 5 is a view similar to FIGS. 3 and 4 showing the detent assembly connected to the vehicle gear shift lever;

FIG. 6 is a side elevational view of another embodiment of the brake actuating mechanism and associated detent assembly, showing, in solid lines, the toggle linkage in the released position; and in phantom the toggle linkage in the locked position; and FIG. 7 is a side elevational view similar to FIG. 6 of a further embodiment of the brake actuating mechanism.

Figure 1:
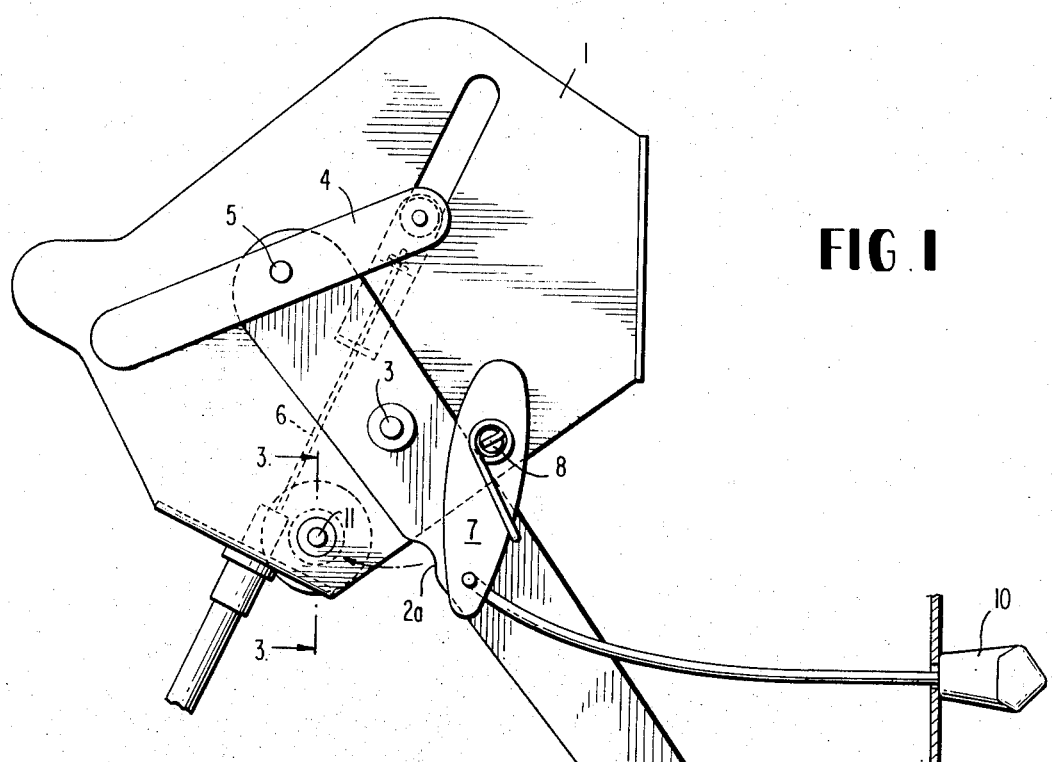
FIG. 1 is a side elevational view of one embodiment of the brake actuating mechanism and associated detent pin.

Referring to the drawings and more particularly to FIGS. 1, 2, 6 and 7, the brake actuating mechanisms to which the detent assembly of the present invention is adapted to be applied are illustrated therein. The mechanisms are identical to the toggle-linkage type brake actuating mechanisms disclosed in my copending application Ser. No. 213,494, filed Dec. 29, 1971, now U.S. Pat. No. 3,741,033, and comprise, essentially, a fixed bracket 1 to which a foot pedal lever 2 is pivotally connected as at 3, the pivotal connection 3 providing the fixed pivot of the toggle linkage. A lever 4 is pivotally connected as at 5 to the end portion of the foot pedal lever 2, the pivotal connection 5 providing the movable pivot of the toggle linkage. A brake actuating cable 6 is connected to the free end of lever 4. By this construction and arrangement, when the movable pivot 5 is disposed on one side of the center line of the fixed pivot 3 as shown in FIG. 1 and in solid lines in FIGS. 6 and 7, the foot pedal lever 2 is in the released position, whereby pressure can be applied to the emergency brake pedal to selectively brake the vehicle in a manner similar to the conventional hydraulic brake system. When the movable pivot 5 is disposed on the opposite side of the center line of the fixed pivot 3, the toggle linkage is disposed in the over-center locked position wherein the emergency brake is fully actuated and the foot pedal lever is in the locked position.

Figure 2:
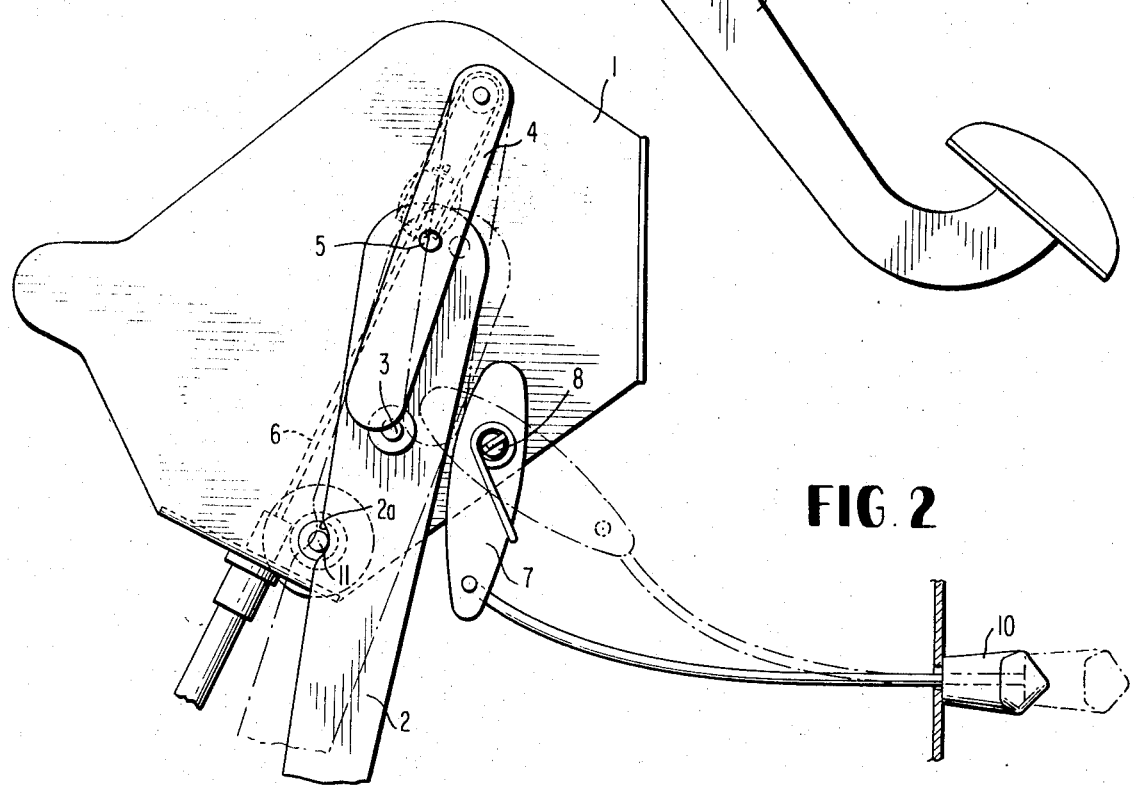
FIG. 2 is a side elevational view of the brake actuating mechanism illustrated in FIG. 1 showing, in solid lines, the brake pedal lever engaging the detent pin, and, in dotted lines, the pin removed from the path of the brake pedal lever and the toggle linkage displaced to the over-center locked position.

A release lever 7 is pivotally connected to the bracket 1, as at 8, and a pull cable 9 having a suitable handle 10 is connected to one end of the release lever 7, the opposite end of the release lever engaging the toggle linkage when in the locked position as shown in dotted lines in FIGS. 2, 6 and 7. To release the toggle linkage, the release cable 9 is pulled thereby pivoting the release lever 7 to cam the toggle linkage to the release side of the pivot 3 as shown in FIG. 1 and in solid lines in FIGS. 6 and 7.

In order to insure that the emergency brake foot pedal lever 2 can be employed to actuate the brakes at all times while the vehicle is underway, irrespective of the pressure applied to the foot pedal, a detent pin 11 is reciprocably mounted in the fixed bracket 1 and disposed transversely thereto whereby the pin is movable into the path of the foot pedal lever 2 to prevent the toggle linkage from moving to the over-center locked position, as shown in FIG. 2, a notch 2a being formed on the edge of the foot pedal lever at the portion thereof which engages the pin.

Various actuators for moving the pin into the path of the foot pedal lever 2 are illustrated in FIGS. 3, 4 and 5. In FIG. 3, the pin 11 is connected to one end of a rod 12 having its opposite end connected to the inner periphery of a diaphragm disc 13, the outer periphery of the diaphragm being sealingly connected to the end of a cylinder 14 by an end plate 15 having apertures 15a formed therein whereby one side of the diaphragm communicates with the atmosphere. The opposite side of the diaphragm is in communication with the vehicle engine's air manifold 16 through a line 17 extending between the manifold and the cylinder 14. A tension spring 18 is provided between an end wall of the cylinder and the rod 12 for biasing the rod 12 inwardly of the cylinder. In the operation of the pin actuator of FIG. 3, when the vehicle engine is running, the differential pressure on the diaphragm, created by the vacuum from the engine manifold on one side of the diaphragm and the atmospheric pressure on the opposite side of the diaphragm, causes the rod 12 and assoaicted pin 11 to slide outwardly of the cylinder while compressing the spring 18 and moving the pin into the path of the foot pedal lever 2. As long as the engine remains running, the pin 11 will remain in the path of the foot pedal lever to thereby prevent the toggle linkage from moving to the over-center locked position. When the engine is stopped, the interior of the cylinder is no longer under vacuum so that the spring 18 overcomes the biasing force of the atmospheric pressure acting on the diaphragm 13, whereby the rod 12 and associated pin are moved inwardly of the cylinder to thereby move the pin out of the path of the foot pedal lever. Once the pin 11 has been moved out of the path of the foot pedal lever, the toggle linkage can be moved to the over-center locked position.

In FIG. 4, the pin 11 is connected to the plunger of a solenoid 19 which is electrically connected to the vehicle ignition switch 20. By this construction and arrangement, when the ignition switch is turned to the "on" position, the solenoid is energized to move the pin 11 to the extended position into the path of the foot pedal lever 2; the pin remaining in the extended position until the ignition switch is turned to the "off" position, whereupon the pin is moved to the retracted position out of the path of the foot pedal lever 2.

In the embodiment of FIG. 5, the pin 11 is connected by a Bowden cable 21 to that part of the vehicle gear shift mechanism (not shown) that prevents the steering wheel from being locked as long as the shift lever 22 is not in the "parking" position. Thus, while the shift lever 22 is in any of the "drive" positions, the pin 11 is disposed in the extended position in the path of the foot pedal lever 2 but when the lever 22 is shifted to the "parking" position, the pin 11 is retracted to allow the toggle linkage to be moved to the overcenter locked position.

From the above description, it will be readily seen that under various operative conditions of a vehicle; that is, while the engine is either running or when the ignition switch is "on," or when the gear shift lever is in one of the "drive" positions, the pin 11 will remain in the path of the foot pedal lever to prevent the toggle linkage from moving to the overcenter locked position, whereby pressure may be applied to the emergency brake pedal to brake the vehicle in a manner similar to the conventional hydraulic brake system. When the vehicle is in an inoperative disposition, that is, when the engine is not running or the ignition switch is turned to the "off" position, or when the shift lever is at the "parking" position, the pin 11 will be moved out of the path of the brake pedal lever 2, whereby the brake pedal may be fully depressed to displace the toggle linkage to the opposite side of the fixed, center pivot thereby actuating the emergency brake to the locked position.

It is to be understood that the forms of the invention hereby shown and described are to be taken as preferred examples of the same, and that various changes in the shape, size and arrangement of parts may be resorted to, without departing from the spirit of the invention or scope of the subjoined claims.

I claim:

1. In a vehicle emergency brake actuating mechanism of the type including a foot pedal lever, a brake actuating cable and an over-center type toggle linkage operatively connected between the foot pedal lever and the brake actuating cable, the improvement comprising detent means disposed in proximity to the path of the toggle linkage, and actuator means operatively connected to said detent means for moving the detent means into and out of the path of the toggle linkage whereby when the detent means is disposed in the path of the toggle linkage the toggle linkage is prevented from moving to the over-center locked position, and when the detent means is disposed out of the path of the toggle linkage, the toggle linkage is movable to the over-center lock position.

2. A vehicle emergency brake actuating mechanism according to claim 1, wherein the toggle linkage is pivotally mounted on a fixed bracket, said detent means comprising a pin disposed parallel to the pivotal axis of the toggle linkage, said pin being slidably mounted in said bracket and reciprocable therein into and out of the path of the toggle linkage.

3. A vehicle emergency brake actuating mechanism according to claim 1, wherein the actuator means comprises, pneumatic means operatively connected to the detent means.

4. A vehicle emergency brake actuating mechanism according to claim 3 wherein the pneumatic means comprises fluid motor means operatively connected between the pin and vehicle engine.

5. A vehicle emergency brake actuating mechanism according to claim 4 wherein the fluid motor means comprises a rod slidably mounted within a cylinder, one end of said rod being connected to said detent means, the opposite end of said rod being connected to piston means mounted in said cylinder.

6. A vehicle emergency brake actuating mechanism according to claim 5 wherein the piston means comprises a diaphragm connected between said opposite end of said rod and said cylinder, one side of said diaphragm being exposed to atmospheric pressure, and conduit means connecting the engine manifold to the cylinder to thereby expose the opposite side of said diaphragm to vacuum, whereby when the vehicle engine is running the detent means is moved to the extended position into the path of the toggle linkage.

7. A vehicle emergency brake actuating mechanism according to claim 5 wherein spring means is disposed between one end of the cylinder and said opposite side of the diaphragm for biasing the detent means to the retracted position whereby when the vehicle engine is stopped the detent means is moved out of the path of the toggle linkage.

8. A vehicle emergency brake actuating mechanism according to claim 1, wherein the actuator means comprises solenoid means operatively connected between the detent means and the vehicle engine ignition switch, whereby when the ignition switch is turned to the "on" position the detent means is moved to the extended position into the path of the toggle linkage, and when the ignition switch is turned to the "off" position the detent means is moved to the retracted position out of the path of the toggle linkage.

9. A vehicle emergency brake actuating mechanism according to claim 1, wherein the actuator means comprises a Bowden cable operatively connected between the detent means and the vehicle gear shift mechanism, whereby when the vehicle gear shift lever is disposed in a "drive" position the detent means is moved to an extended position into the path of the toggle linkage, and when the gear shift lever is disposed in the "parking" position the detent means is moved to a retracted position out of the path of the toggle linkage.

* * * * *